United States Patent
Petrovic

(10) Patent No.: US 7,857,119 B2
(45) Date of Patent: Dec. 28, 2010

(54) METHOD FOR GROUPING BOXES ON A CONVEYOR LINE AND DEVICE FOR CARRYING OUT SAID METHOD

(75) Inventor: Zmaj Petrovic, Octeville-sur-Mer (FR)

(73) Assignee: Sidel Participations, Octeville-Sur-Mer (FR)

(*) Notice: Subject to any disclaimer, the term of this patent is extended or adjusted under 35 U.S.C. 154(b) by 114 days.

(21) Appl. No.: 11/997,488

(22) PCT Filed: Aug. 1, 2006

(86) PCT No.: PCT/FR2006/001855
§ 371 (c)(1),
(2), (4) Date: Jan. 31, 2008

(87) PCT Pub. No.: WO2007/015000
PCT Pub. Date: Feb. 8, 2007

(65) Prior Publication Data
US 2008/0213081 A1    Sep. 4, 2008

(30) Foreign Application Priority Data
Aug. 2, 2005    (FR) .................................. 05 08213

(51) Int. Cl.
*B65G 25/00* (2006.01)
(52) U.S. Cl. .................................. 198/419.1; 198/429

(58) Field of Classification Search .............. 198/419.1, 198/429, 459.6, 459.7, 465.98
See application file for complete search history.

(56) References Cited

U.S. PATENT DOCUMENTS

| | | | |
|---|---|---|---|
| 3,961,700 A | | 6/1976 | Fleischauer |
| 4,296,590 A | * | 10/1981 | Focke .......................... 53/531 |
| 4,756,400 A | * | 7/1988 | Funo et al. ................ 198/418.7 |
| 4,962,625 A | * | 10/1990 | Johnson et al. ................ 53/157 |
| 6,321,896 B1 | * | 11/2001 | Zuccheri et al. .......... 198/419.1 |
| 6,360,871 B1 | * | 3/2002 | Meyer et al. ............. 198/419.1 |

* cited by examiner

*Primary Examiner*—Gene Crawford
*Assistant Examiner*—Kavel P Singh
(74) *Attorney, Agent, or Firm*—Sughrue Mion, PLLC

(57) ABSTRACT

A method for grouping boxes, after stopping the head box of a train line, includes transversally displacing a last box of the train line with respect to the first box of the upstream line waiting for grouping and introducing a stop motion unit for holding the upstream line into the space cleared by the last box. The conveyor device includes an endless lateral rail which is used for guiding boxes and is laterally shifted at a length corresponding to at least the box longitudinal dimension and forms something like a funnel at the location of the last box of the train and a device, which is used for transversally displacing the last box by pushing it into the funnel and includes the stop motion unit holding the first box of the upstream line.

6 Claims, 3 Drawing Sheets

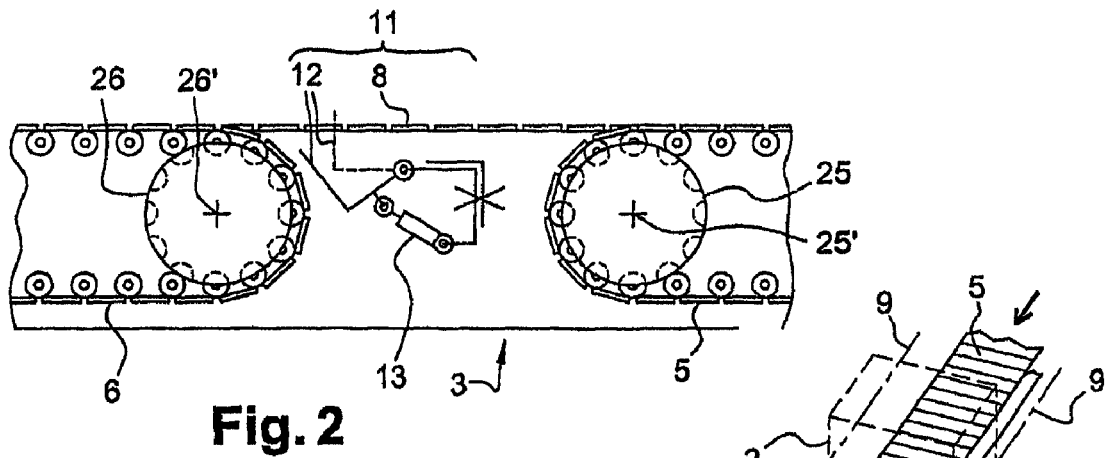
Fig. 2
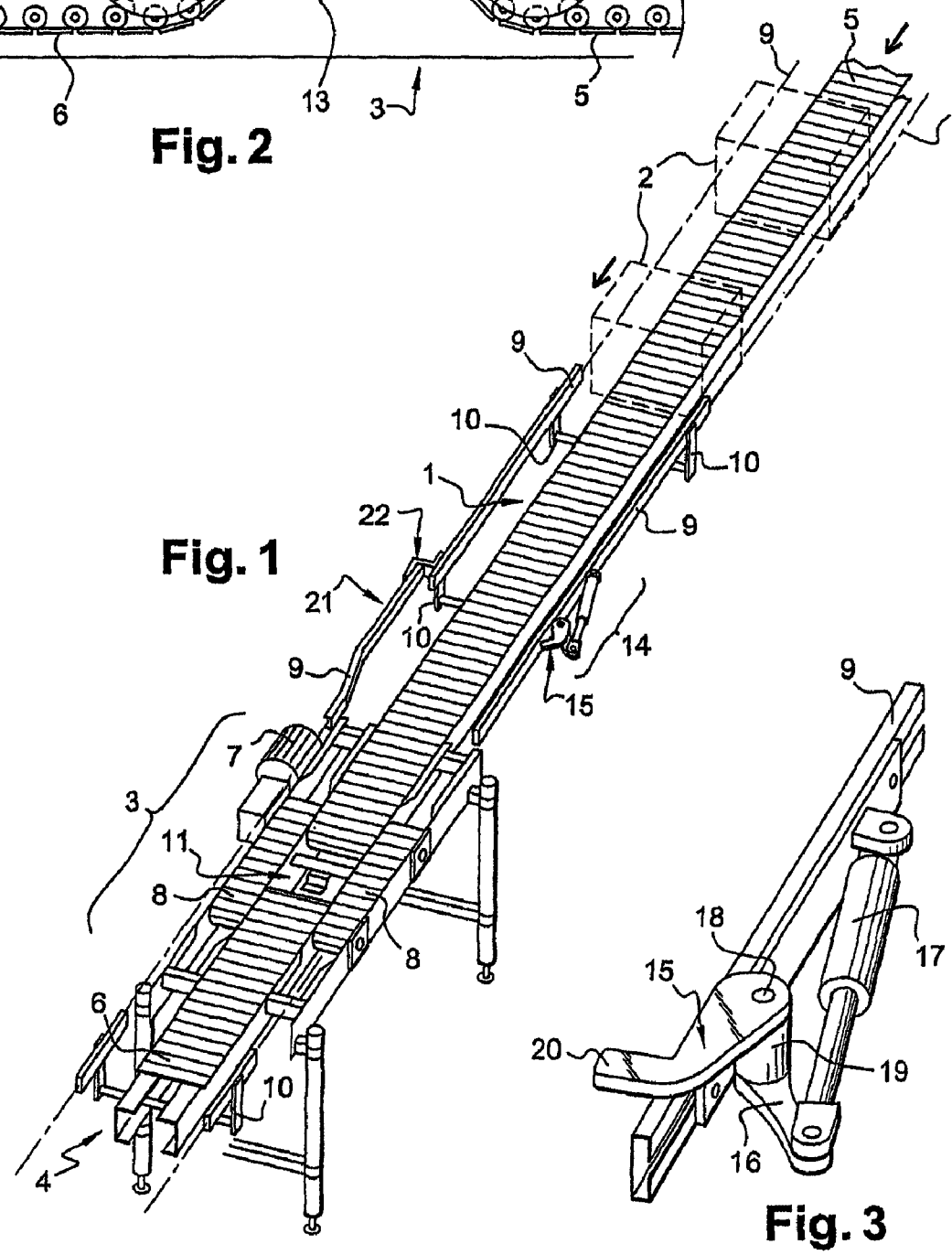
Fig. 1
Fig. 3

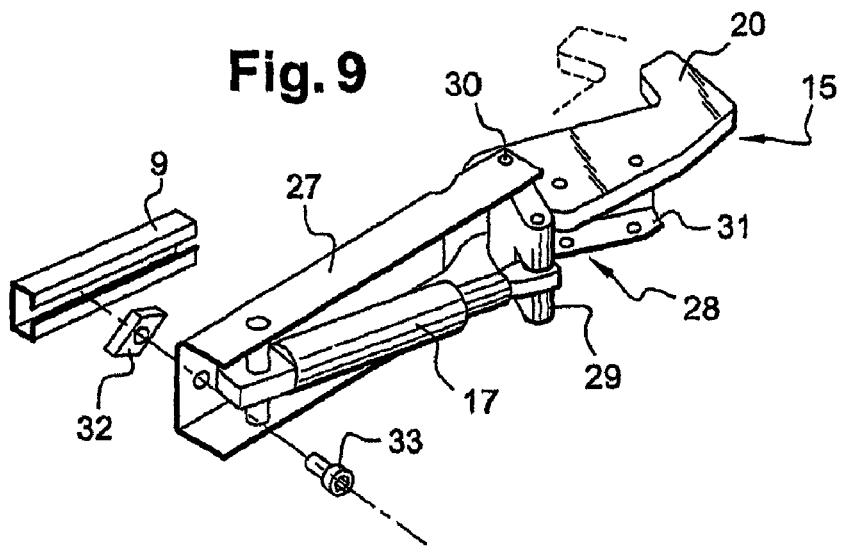
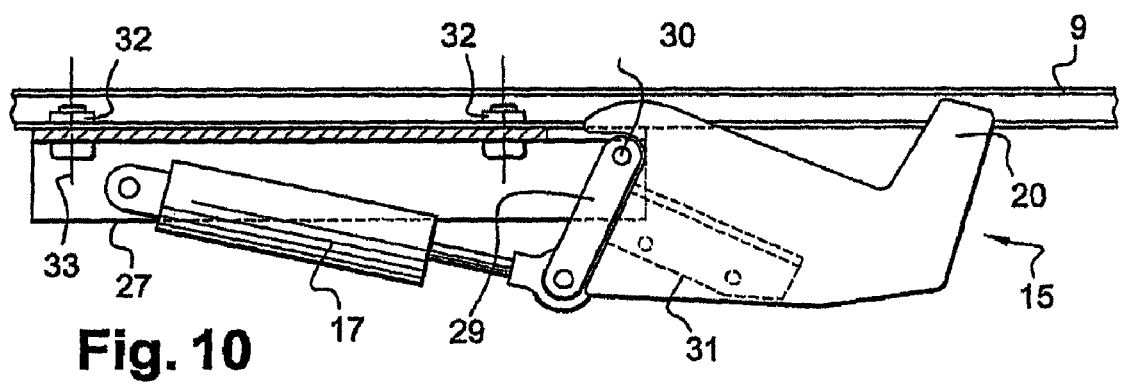
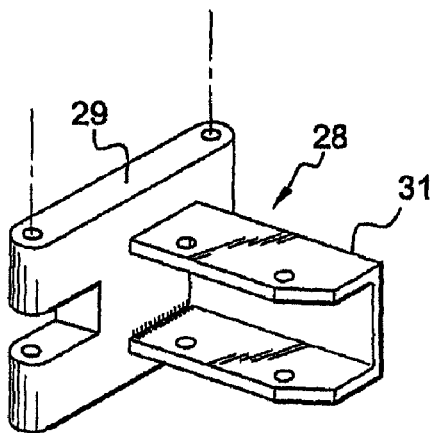
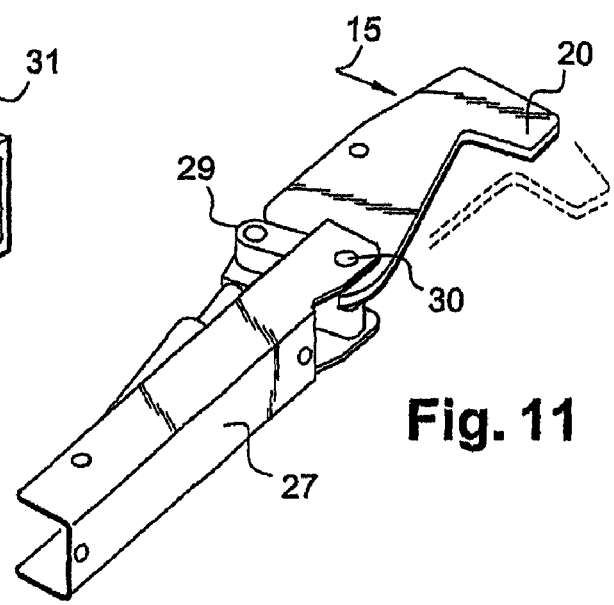

METHOD FOR GROUPING BOXES ON A CONVEYOR LINE AND DEVICE FOR CARRYING OUT SAID METHOD

FIELD OF THE INVENTION

The present invention relates to a method for grouping boxes on a conveyor device for the purpose of forming box trains.

It is likewise concerned with the conveyor device designed for carrying out the grouping method and with the particular means associated with this conveyor device in order to make it possible to carry out said method.

DESCRIPTION OF THE RELATED ART

The formation of box trains on conveyor devices, in particular bottle box trains, is found in some installations, such as, for example, installations equipped with a system for palletizing these boxes. The boxes are, for example, grouped in threes or fours, or even fives, according to their dimensions, in order to be stored on pallets by means of a suitable manipulator device.

The work rates are such that it is more and more difficult to manage and control the formation of these box trains efficiently; there are many problems. Since the boxes are simply placed on the conveyor line, in particular on an endless conveyor belt, some of the risks arise from the slipping of these boxes on said conveyor belt.

In order to arrive at controlling the operating process and at managing the movement of the boxes, the stresses and forces applied to these are more and more important, causing deformations and also damage, either due to rapid wear or due to destruction. To be precise, the control of the process of forming trains and, in particular, managing the coordination of the various actions in order to achieve the grouping of the boxes are becoming more and more difficult.

Thus, for example, when the limit stop releases the box train formed, the various boxes of this train are offset virtually systematically with respect to one another; this offset may be a disadvantage for some applications of the palletizing type, since it necessitates a new grouping of said boxes at the palletizing station.

SUMMARY OF THE INVENTION

The present invention proposes means which make it possible to overcome the problems presented by the work rates; it also avoids maltreatments of the boxes and improves the efficiency of the process for grouping the boxes in order to form box trains accurately, thus making it possible, in particular, to form a compact box train, that is to say with boxes in contact with one another.

The present invention likewise proposes means which are easily adapted to a conveyor device comprising an endless conveyor belt and lateral guides which together form a type of corridor for the travel of the boxes. These means are a type of accessory capable of being installed easily, wherever necessary, on the conveyor device.

The method according to the invention comprises, after the first box forming the file head of the train has been immobilized by means of a downstream stop, offsetting the last box of said train transversely with respect to the first box of the upstream file which is on grouping standby, and introducing into the space thus released by said last box a stop, called an upstream stop, responsible for retaining said upstream file.

Still according to the invention, the method comprises offsetting transversely the last box of the train formed by means of the upstream stop, said offset being implemented simultaneously with the active positioning of said upstream stop in order to stop the first box of the upstream file which is on grouping standby.

According to another arrangement of the invention, the method comprises positioning the upstream stop downstream of the first box of the upstream file, at a distance from the latter which is of the order of one third of the longitudinal dimension of the boxes, in order to give rise, after the retraction of the downstream stop which releases the box train formed, to a push on said train, in particular on its last box, by means of the box or boxes of said upstream file. This momentum which is given to the box train makes it possible to form a compact box train.

Still according to the invention, the method comprises detecting the passage of the boxes upstream of the downstream stop and, by suitable means, reducing the speed of the conveyor belt feeding said boxes, so as to mitigate the shock of the first box of the train being formed on said downstream stop.

The invention is likewise concerned with the conveyor device of the endless conveyor belt type, making it possible to convey boxes in Indian file, in a corridor which is delimited by said conveyor belt and by lateral guides in the form of rails, which conveyor line comprises means of the stop type in order to form a box train, particularly a downstream stop, and it comprises, on the one hand, a discontinuous lateral rail, which rail is set apart laterally over a length corresponding at least to the longitudinal dimensions of a box, thus forming a type of funnel in the region of the location of the last box of said train, and, on the other hand, means for offsetting said last box transversely by pushing it into said funnel, thus releasing a space sufficient for accommodating an upstream stop which is responsible for retaining the first box of the upstream file at the intended time.

According to another arrangement of the invention, the upstream stop is arranged laterally, on the side of the continuous rail, and is located opposite the funnel-shaped crank formed on the opposite lateral rail, which stop is in the form of a retaining hook which is driven in a rotational movement about an axis perpendicular to the plane of the conveyor belt, which hook is operated by means of the jack type, in order to pass from a retracted position into a position stopping the first box of the upstream file on grouping standby.

Still according to the invention, the hook comprises a projecting part in the form of a fang, which is offset downstream with respect to the entry of the funnel, at a distance which is in the order of one third of the longitudinal dimension of the boxes arranged on the conveyor line.

According to another arrangement of the invention, a sensor is arranged upstream of the downstream stop and downstream of the upstream stop, so as to detect the passage of the boxes and make it possible by suitable means to reduce the speed of the conveyor belt feeding said boxes, for the purpose of mitigating the shock between the first box of the train and said downstream stop.

The invention is likewise concerned with the upstream stop system designed to form a type of accessory for the conveyor device. This stop system comprises a frame capable of being fastened to one of the rails forming the guide corridor of the boxes, which frame consists of a profile, the cross section of which is U-shaped; it comprises the hinge pin of the hook, and it likewise supports the jack for operating said hook.

According to another arrangement of the invention, the retaining hook consists of a separate part attached to a support which is interposed between said hook and the jack, which support comprises a lever which is operated by said jack and a bracket which makes it possible to fasten said hook; to be precise, this bracket makes it possible to install the hook in a position which affords said stop device the possibility of being installed on either one of the guide rails of the boxes, on the right or on the left of the conveyor belt.

BRIEF DESCRIPTION OF THE DRAWINGS

However, the invention will be described in more detail with the aid of the following description and the accompanying drawings which are given by way of illustration and in which:

FIG. 1 shows diagrammatically a conveyor device making it possible to form box trains;

FIG. 2 illustrates, also diagrammatically, a sectional elevation of the downstream stop system which makes it possible to stop the first box of the train to be formed;

FIG. 3 illustrates, in more detail and likewise diagrammatically, the upstream stop system which makes it possible to set apart the last box of the train and stop the first box of the upstream file on grouping standby;

FIG. 9 illustrates in perspective an upstream stop device in the form of an accessory, capable of being installed on the lateral guide rail located on the right of the corridor of the conveyor line;

FIG. 10 illustrates diagrammatically, in plan, the upstream stop device of FIG. 9;

FIG. 11 illustrates an upstream stop device designed to be associated with a lateral guide rail located on the left side of the conveyor line;

FIG. 12 illustrates in perspective a detail of the support on which the hook is installed for positioning on the right or on the left on the lateral rails which delimit the guide corridor of the boxes.

DETAILED DESCRIPTION OF THE INVENTION

Figure 4:
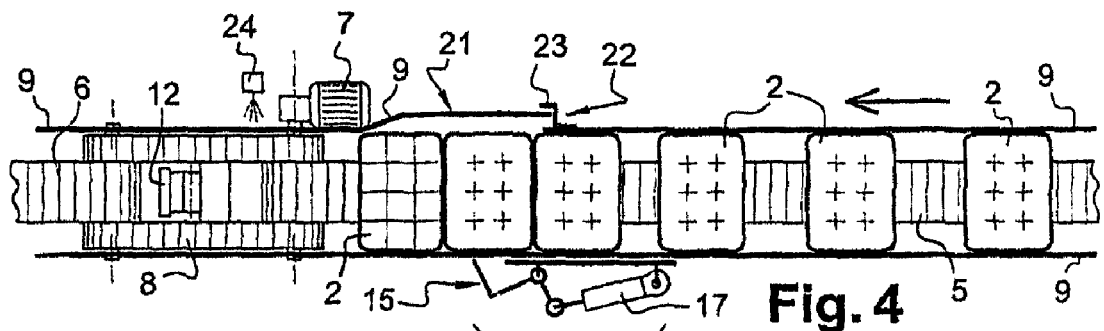
FIGS. 4 to 8 show, still diagrammatically, the various steps of the process of forming a box train.

The conveyor device illustrated in FIG. 1 comprises a conveyor line (1) for feeding the boxes (2); this conveyor line (1) is arranged upstream of an intermediate module (3) which forms a type of junction between said conveyor line (1) and a conveyor line (4) arranged downstream of said intermediate module (3). The conveyor belt (5) of the conveyor line (1) and the conveyor belt (6) of the conveyor line (4) extend onto the module (3). The conveyor belt (5) is driven by means of a geared motor (7) installed on the module (3).

In order to pass from the conveyor belt (5) to the conveyor belt (6), the boxes (2) are taken up, that is to say are carried and driven, by means of two conveyor belts (8) arranged on each side of the ends of said conveyor belts (5) and (6). These two conveyor belts (8) are in the form of crawler tracks, and they make the junction between the downstream end of the conveyor belt (5) and the upstream end of the conveyor belt (6). These conveyor belts (8) are driven directly by the downstream conveyor belt (6); they are mounted freely on the shaft of the upstream conveyor belt (5), as explained later.

The boxes (2) are carried and driven by the various conveyor belts (5, 6 and 8), and they are guided laterally by rails (9) which, with said conveyor belts, form a type of corridor. These rails (9) are carried, from place to place, by structures (10) fastened to the conveyor lines.

The intermediate module (3) comprises, in its central part, a first stop system (11), called a downstream stop, which makes it possible to stop the first box (2) during the formation of a box train. This downstream stop system, shown in detail in FIG. 2, comprises an actual stop (12) which is movable under the effect of a jack (13). This stop (12) is arranged between the ends of the conveyor belts (5) and (6) of the conveyor lines (1) and (4) respectively and between the two laterally arranged conveyor belts (8).

When the number of boxes (2) stopped by the downstream stop (12) is sufficient to form the intended box train, a second stop system (14), called an upstream stop, is put into operation in order to retain the upstream file, starting from the first box of this file.

This second stop system, as shown in detail in FIG. 3, comprises an actual stop (15); this stop takes the form of a hook which is operated by an arm (16) actuated by means of a jack (17). This upstream stop system is installed laterally on one of the rails (9), in particular on the rail located on the left side of the guide corridor of the boxes (2). As described in detail later, it may likewise be installed on the right side, depending on circumstances.

The stop (15), in the form of a hook, is articulated by means of a hinge pin (18) in a hub (19) which is integral with the lateral rail (9); this hinge pin (18) and the hub (19) are perpendicular to the plane of the conveyor belt (5). The box (2) which is located after the last box of the train formed is retained mechanically by the fang (20) of the hook; its hold does not depend directly on the pressure prevailing in the operating jack (17).

In order to retain this first box of the upstream file on grouping standby, the fang (20) of the stop (15) penetrates into the travel corridor of the boxes (2), and, to be able to be positioned, it pushes and sets apart the last box of the train formed. In order to obtain this transverse offset of the last box of the train formed, the rail (9) located opposite the stop (15) comprises a discontinuity which makes it possible to implement a localized widening of the guide corridor of the boxes. This widening forms a type of funnel (21) which is located in the region of the last boxes of the train formed.

Figure 5:
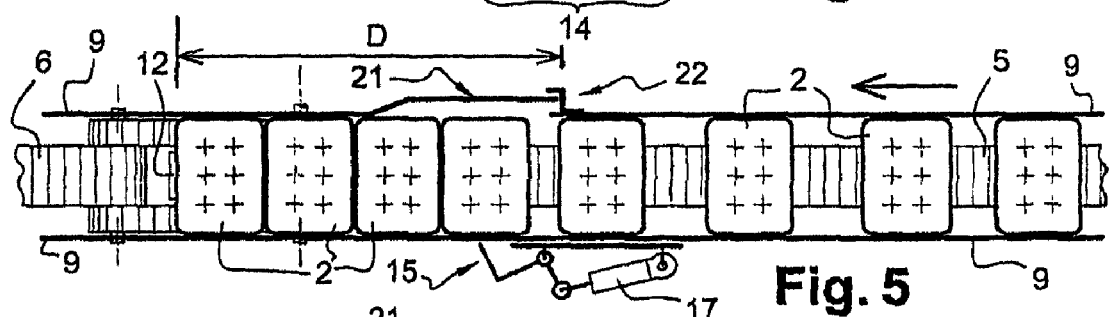

The offset (22) on the rail (9) is set up by means of a bayonet-shaped staple (23) and a fold of said rail in its downstream part. This offset (22) is located at a distance D from the downstream stop (12), as can be seen in FIG. 5, which is substantially greater than the length of the box train. The longitudinal dimension of the funnel (21) is greater than the longitudinal dimension of the boxes (2) arranged on the conveyor line by the amount of one and a half times this dimension.

The widening of the guide corridor of the boxes corresponds at least to the dimension of the fang (20) of the hook-shaped stop (15), said fang projecting into the corridor when said stop is in the active stopping position. As described in detail later, this fang (20) is located downstream of the offset (22) formed on the rail (9). The distance d which separates this fang (20) when it is in the active stopping position and this offset (22) is of the order of one third of the longitudinal dimension of the boxes traveling in the corridor. As explained below, this distance makes it possible to delay the stopping of the first box of the upstream file on grouping standby, the effect of which, during its release, is to cause the box train to be pushed by said first box of the upstream file and, consequently, to maintain the contact of the boxes of said train with one another. The momentum which is imparted to the box train by the upstream file during the retraction of the downstream stop (12) is sufficient to ensure this compactness of said box train.

FIGS. 4 to 8 illustrate the formation of a box train (2) by means of the conveyor device according to the invention, described in detail above. The various figures correspond to a diagrammatic plan view of the conveyor device, with the boxes (2) being illustrated in simplified form.

The boxes (2) are fed toward the downstream stop (12) by means of the upstream conveyor belt (5) and the intermediate conveyor belts (8), which conveyor belts (8) are driven by the downstream conveyor belt (6). The guide rail (9) located on the right side comprises a discontinuity, and, starting from the offset (22), this rail, on its downstream part, is offset laterally so as to form a type of funnel (21) which makes it possible to widen the guide corridor of the boxes (2).

Opposite the offset (22), on the other rail (9) located on the left, there is a second stop system (14), that is to say the hook-shaped upstream stop (15), which is operated by the jack (17).

In FIG. 4, the downstream stop (12) is in the active stopping position; the upstream stop (15) is in the inactive position; the boxes (2) advance towards said stop (12).

Figure 6:
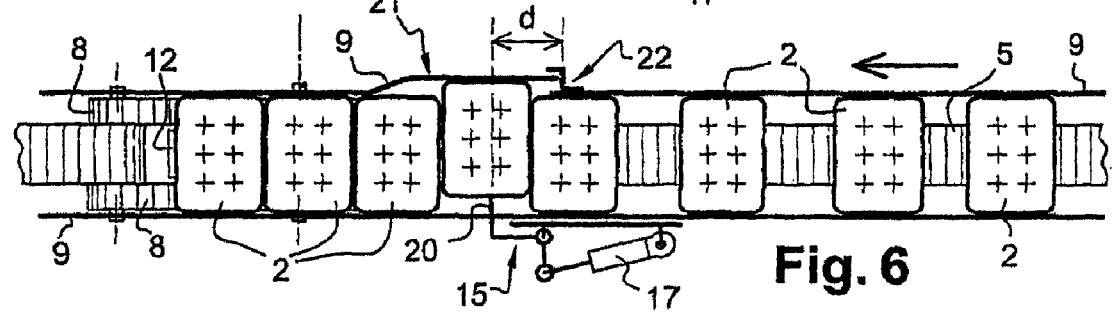

In FIG. 5, the four boxes (2) which form a box train are stopped by the downstream stop (12), and the other boxes upstream continue to advance, fed by the conveyor belt (5). When the box train is formed, as illustrated in FIG. 5 or FIG. 6, the last box of the train formed is displaced transversely and is positioned in the space generated by the funnel (21). This transverse displacement of the last box of the train is carried out by means of the upstream stop (15) when the latter is placed in the active stopping position under the effect of the jack (17); it is the fang (20) of this upstream stop (15) which shoves the last box of the train and offsets it laterally.

Figure 7:
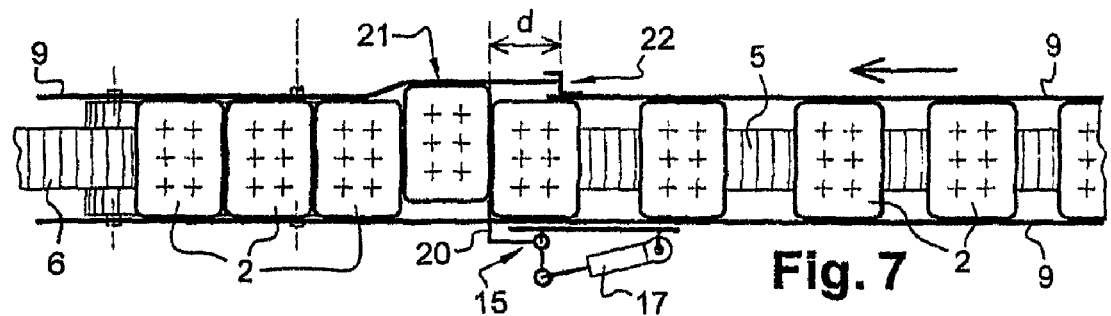

As soon as the upstream stop (15) is in the active stopping position, the downstream stop (12) can be retracted, as illustrated in FIG. 7. The retraction of the downstream stop (12) makes it possible to remove the four boxes forming the train. These boxes are driven by the two conveyor belts (8) and then by the conveyor belt (6); they are likewise driven by the conveyor belt (5).

The various boxes of the upstream file, which are arranged on the conveyor belt (5), are on standby and slide on said conveyor belt which continues to advance. Thus, as soon as the downstream stop (12) is retracted, the boxes of this upstream file are released, and they are set in motion up to the moment when they are stopped, in turn, by the upstream stop (15). This advancing movement of the upstream boxes makes it easier to start up the box train formed; the upstream box or boxes push the last box of said train over a distance d which is of the order of one third of the longitudinal dimension of the boxes on the conveyor device.

This momentum which is imparted to the box train in order to help said boxes start up originates from this distance d which is shown in FIG. 6. In this figure, the upstream stop (15) is in the active position in order to stop the boxes of the upstream file on grouping standby which are fed by the conveyor belt (5).

Figure 8:
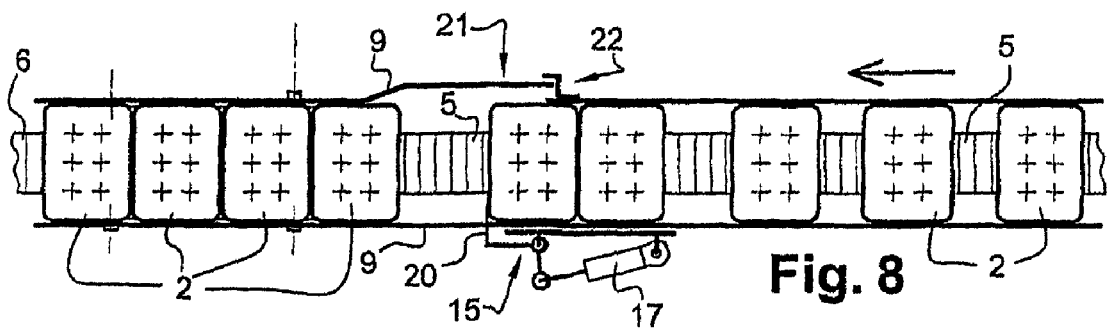

As soon as the box train has been carried away by the downstream conveyor belt (6), as shown in FIG. 8, and as soon as it has left the zone of the downstream stop (12), the latter can resume an active position, as illustrated in FIG. 4, in order to stop the other boxes for the purpose of forming a new box train.

In order to prevent excessive shocks on this downstream stop (12), a sensor (24) may be installed upstream of the stop (12), as illustrated in FIG. 4; this sensor (24) makes it possible by suitable means to act on the geared motor (7) in order to adjust the speed of the conveyor belt (5) feeding the boxes, by reducing this speed to a value sufficient to reduce the impact of the first box on this downstream stop (12).

This adjustment of the speed is obtained because, as mentioned above, the conveyor belt (5) and the conveyor belt (6) are not integral with one another in terms of their drive.

As illustrated in FIG. 2, the conveyor belt (5) is mounted on a wheel (25) of the notched type, which wheel (25) is driven by the shaft (25') of the geared motor (7). The conveyor belt (6) is mounted on a wheel (26), likewise of the notched type, which wheel (26) is carried by a nonmotorized shaft (26'), which is guided in the structure of the module (3).

The conveyor belts (8), in the form of crawler tracks, which ensure continuity between the conveyor belts (5) and (6), are likewise mounted on wheels, not illustrated in the figures, which wheels are carried by the shafts (25'), and (26') on either side of the wheels of said conveyor belts.

The driving of conveyor belts (8) is carried out by means of the downstream conveyor belt (6), in particular by means of the shaft (26') to which the various wheels of said conveyor belts (6) and (8) are secured.

The other wheels of the conveyor belts (8) either are smooth or are mounted freely on the shaft (25') which implements the drive of the conveyor belt (5).

FIG. 9 shows the upstream stop system designed to be installed on the guide rails (9) of the boxes; this upstream stop system is designed to be installed as a simple accessory either on the right rail or on the left rail of the guide corridor of the boxes (2).

FIG. 9 shows an upstream stop system which is installed on a rail (9) located on the right side. This stop system comprises a structure or frame (27) which consists of a profile portion of U-shaped cross section, the dimensions of which are greater than those of the cross section of the rail (9). This frame (27) serves as a support and guide for the jack (17) and for the hook-shaped stop (15). This hook takes the form of a cut-out flat, and it is fastened to a member (28), functioning as a support, which is interposed between said hook and the jack (17).

As illustrated in FIG. 10, the contour of the hook is shaped in such a way that, in the inactive position, it does not impede the travel of the boxes; it is set back slightly with respect to the rail (9), flush with the latter.

The member (28) which supports the hook is illustrated in FIG. 12; it comprises a lever (29), articulated in the frame (27) by means of a hinge pin (30), and a structured bracket (31) for mounting this hook on the right or on the left. The hinge pin (30) between the lever (29) and the frame (27) is vertical and is perpendicular to the rail (9); this hinge pin (30) absorbs the forces and shocks exerted on the fang (20) of the hook by the boxes (2).

The bracket (31) which takes the form of a profile of U-shaped cross section, the thickness of which corresponds to that of the rails (9), is fastened perpendicularly to the lever (29) in the middle part of the latter.

FIG. 9 shows an upstream stop system which is installed on the rail (9) located on the right side of the guide corridor of the boxes; FIG. 11 illustrates an upstream stop system which is installed on the left rail of said corridor and which is identical to the preceding one, except that the hook is installed on the other side of the bracket (29).

In both instances, the frame (27) is fastened to the rail (9), which rail (9) is in the form of a hollow profile open laterally outward. The frame (27) is fastened to the rail by means of nuts (32) in the form of parallelograms, which are accommodated and locked in the cavity of said rail, and by means of associated screws (33).

The invention claimed is:

1. A conveyor device for carrying out a method for grouping boxes for the formation of box trains on a conveyor device with an endless conveyor belt which conveys said boxes in Indian file in a corridor delimited by lateral guides in the form of rails, wherein the method comprises, after a box located at the head of the tile of a train has been immobilized by use of a downstream stop, offsetting transversely to a direction of conveyance of said boxes by said conveyor a last box of said train formed with respect to a first box of an upstream file on grouping standby, and introducing into the space thus released by said last box a stop, called an upstream stop, responsible for retaining said upstream file, starting from said first box on grouping standby, said conveyor device comprising:

a downstream stop for forming a box train on a conveyor belt;

a discontinuous lateral rail, which is set apart laterally over a length which corresponds at least to the longitudinal dimension of a box, thus forming a type of funnel in the region of the location of the last box of said train:

means for offsetting said last box transversely to a longitudinal direction of said train by pushing said last box into said funnel, thus releasing a space sufficient for accommodating an upstream stop responsible for stopping boxes of an upstream file on grouping standby; and an upstream stop system arranged laterally on the side of a continuous rail, opposite the offset in the form of said funnel of said discontinuous lateral rail, which upstream stop system comprises an actual stop in the form of a hook, movable about an axis perpendicular to the plane of said conveyor belt of the boxes, which stop is operated by means of the jack type in order to cause said stop to pass from the retracted position into a position for stopping the boxes of said upstream file on grouping standby, wherein said hook includes a projecting part in the form of a fang that is arranged downstream of the entry of said funnel, at a distance d which is of the order of one third of the longitudinal dimension of said boxes arranged on said conveyor belt.

2. The conveyor device as claimed in claim 1, wherein said upstream stop system is designed in the manner of an accessory, which stop system comprises a frame consisting of a profile, the cross section of which is U-shaped, capable of being fastened to one of said rails forming a guide corridor of said boxes, which frame comprises the hinge pin of said hook and likewise supports said jack for operating said hook.

3. The conveyor device as claimed in claim 2, wherein said upstream stop system comprises a retaining hook in the form of a separate part, attached to a support which is interposed between said hook and the jack, which support comprises a lever which is operated by said jack and a U-shaped bracket arranged in a middle part of said lever, which U has a thickness corresponding to that of the rails, making it possible to fasten said hook in a position which affords said stop device the possibility of being installed on either one of the guide rails of said boxes, on the right or on the left of the conveyor belt.

4. The conveyor device as claimed in claim 1, further comprising a sensor arranged upstream of said downstream stop in order to detect the passage of said boxes and to make it possible by suitable means to reduce the speed of said conveyor belt feeding said boxes when said boxes approach said downstream stop.

5. A method for grouping boxes for the formation of box trains, comprising:

providing a conveyor comprising an endless conveyor belt that conveys boxes in a file in a corridor delimited by lateral rail guides;

conveying boxes by the conveyor;

stopping with a downstream stop a first box from the boxes being conveyed:

offsetting in a direction transverse to a direction of conveyance of the boxes by the conveyor a second box from the boxes being conveyed, the second box is upstream of the first box, the step of offsetting creating a lateral space between the box that is offset and one of the rail guides, the first box, the second box and any boxes in between the first box and the second box forming a train of boxes;

introducing into the lateral space an upstream stop that stops boxes upstream of the train of boxes, wherein at least one of the lateral guide rails comprises a discontinuous section comprising a guide rail portion laterally spaced over a length that corresponds at least to a longitudinal dimension of a box, thus forming a widened portion to allow for the offsetting of the second box;

the upstream stop comprising an articulated member that is movable between an inactive position in which the articulated member is not in the path of the boxes being conveyed and an active position in which the articulated member is in the path of the boxes being conveyed.

6. The method of claim 5, wherein the upstream stop comprises a hook that rotates about a hinge in a horizontal plane so as to laterally push the box being offset into the lateral space and block a next box upstream of the box being offset.

* * * * *